(12) United States Patent
Pandey et al.

(10) Patent No.: US 11,397,256 B2
(45) Date of Patent: **\*Jul. 26, 2022**

(54) ESTIMATING ANGLE MEASUREMENTS FOR SOURCE TRACKING USING A PHASED ARRAY SYSTEM

(71) Applicant: Cypress Semiconductor Corporation, San Jose, CA (US)

(72) Inventors: Ashutosh Pandey, Irvine, CA (US); Nhan Tran, Fountain Valley, CA (US); Jie Lai, Belle Mead, NJ (US); James Wihardja, Tustin, CA (US); Durai Thirupathi, Irvine, CA (US)

(73) Assignee: Cypress Semiconductor Corporation, San Jose, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 16/941,356

(22) Filed: Jul. 28, 2020

(65) Prior Publication Data

US 2021/0041552 A1 Feb. 11, 2021

Related U.S. Application Data

(63) Continuation of application No. 15/980,984, filed on May 16, 2018, now Pat. No. 10,746,864, which is a
(Continued)

(51) Int. Cl.
*G01S 3/46* (2006.01)
*G01S 13/44* (2006.01)
(Continued)

(52) U.S. Cl.
CPC ............ *G01S 13/4454* (2013.01); *G01S 3/32* (2013.01); *G01S 3/46* (2013.01); *G01S 13/42* (2013.01)

(58) Field of Classification Search
CPC .......... G01S 13/4454; G01S 3/32; G01S 3/46
(Continued)

(56) References Cited

U.S. PATENT DOCUMENTS 5,262,789 A \* 11/1993 Silverstein ............... H01Q 3/22
342/368
6,683,569 B1 1/2004 Collier et al.
(Continued)

FOREIGN PATENT DOCUMENTS

CN 103260240 A 8/2013
CN 103634038 A 3/2014
(Continued)

OTHER PUBLICATIONS

China National Intellectual Property Administration Office Action for International Application No. 2018800179982 dated Mar. 4, 2020, 8 pages.
(Continued)

*Primary Examiner* — Harry K Liu

(57) ABSTRACT

Example apparatus, systems and methods use a receiver of a first device to receive from a second device, radio frequency (RF) signals. Embodiments use a processor of the first device to determine, based on the RF signals, a set of angle-estimation values of an angle between a plurality of antenna elements of one of the first device and the second device and an antenna element of the other of the first device and the second device, and a set of confidence measurements. Each of the set of confidence measurements indicates a confidence of an angle-estimation value of the set of angle-estimation values.

20 Claims, 8 Drawing Sheets

Related U.S. Application Data continuation of application No. 15/631,733, filed on Jun. 23, 2017, now Pat. No. 9,989,633.

(60) Provisional application No. 62/471,728, filed on Mar. 15, 2017.

(51) Int. Cl.
    *G01S 13/42* (2006.01)
    *G01S 3/32* (2006.01)

(58) Field of Classification Search
    USPC .......................................................... 342/359
    See application file for complete search history.

(56) References Cited

U.S. PATENT DOCUMENTS

| | | | |
|---|---|---|---|
| 7,171,025 | B2 | 1/2007 | Rui et al. |
| 7,274,332 | B1 | 9/2007 | Dupray |
| 8,095,185 | B2 | 1/2012 | Stephenne |
| 8,659,430 | B2 | 2/2014 | Bloy et al. |
| 9,523,758 | B2 | 12/2016 | Stensland et al. |
| 9,562,961 | B1 | 2/2017 | Baker |
| 2012/0319903 | A1 | 12/2012 | Huseth et al. |
| 2014/0099970 | A1 | 4/2014 | Siomina et al. |
| 2016/0266245 | A1 | 9/2016 | Bharadia et al. |
| 2017/0026798 | A1 | 1/2017 | Prevatt |

FOREIGN PATENT DOCUMENTS

| | | | |
|---|---|---|---|
| CN | 104965191 | A * | 10/2015 |
| CN | 103620438 | B | 5/2016 |
| EP | 3123197 | A2 | 2/2017 |
| JP | 9130128 | A | 5/1997 |
| JP | 11281737 | A | 10/1999 |

OTHER PUBLICATIONS

Search Report for International Application No. PCT/US2018/019265 dated Mar. 26, 2018; 3 pages.

USPTO Non Final Rejection for U.S. Appl. No. 15/980,984 dated Jan. 8, 2020; 6 pages.

USPTO Non-Final Rejection for U.S. Appl. No. 15/631,733 dated Sep. 20, 2017; 6 pages.

USPTO Notice of Allowance for U.S. Appl. No. 15/631,733 dated Feb. 12, 2018; 5 pages.

USPTO Notice of Allowance for U.S. Appl. No. 15/631,733 dated May 8, 2018; 2 pages.

USPTO Notice of Allowance for U.S. Appl. No. 15/980,984 dated Apr. 16, 2020; 5 pages.

Written Opinion of the International Searching Authority for International Application No. PCT/US2018/019265 dated Mar. 26, 2018; 4 pages.

* cited by examiner

ESTIMATING ANGLE MEASUREMENTS FOR SOURCE TRACKING USING A PHASED ARRAY SYSTEM

RELATED APPLICATIONS

This application is a continuation of U.S. Non-Provisional patent application Ser. No. 15/980,984, filed on May 16, 2018, which is a Continuation of U.S. patent application Ser. No. 15/631,733, filed Jun. 23, 2017, now U.S. Pat. No. 9,989,633, issued on Jun. 5, 2018, which claims the benefit of U.S. Provisional Application No. 62/471,728, filed Mar. 15, 2017, all of which are incorporated by reference herein in their entirety.

BACKGROUND

Source tracking refers to a procedure where an angle is determined between a single antenna and a phased array of multiple antennas. The goal of a source-tracking estimation algorithm is to locate a source with respect to a phased array. Source tracking can be done using a phased array at a receiver and a single antenna at a transmitter. This configuration is known as Angle-of-Arrival (AoA). Source tracking can also be done using a phased array at a transmitter and a single antenna at a receiver. This configuration is known as Angle-of-Departure (AoD). The source-tracking estimation algorithms are also referred to as Time-Delay-of-Arrival (TDoA) or Direction-of-Arrival (DoA).

BRIEF DESCRIPTION OF THE DRAWINGS

The present disclosure is illustrated by way of example, and not of limitation, in the figures of the accompanying drawings in which.

DETAILED DESCRIPTION

Figure 1:
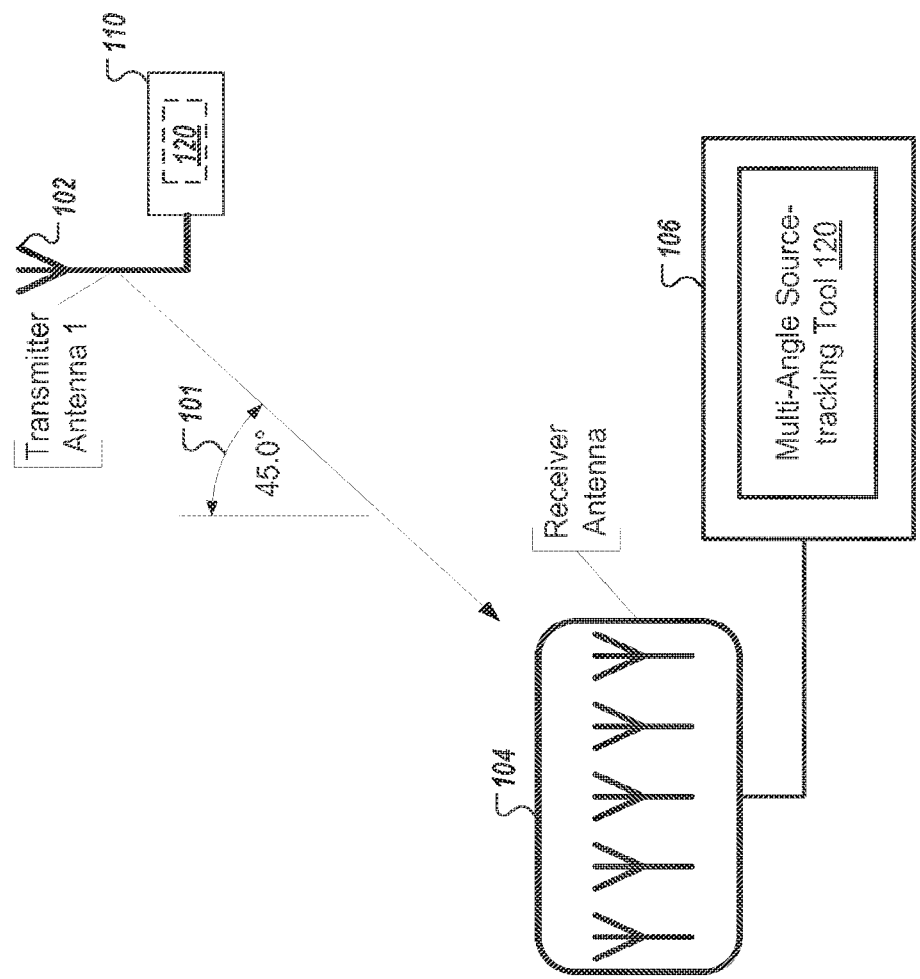
FIG. 1 is a block diagram illustrating a multi-angle source-tracking tool to estimate angles between a phased array antenna and a second antenna according to one embodiment.
Figure 1:
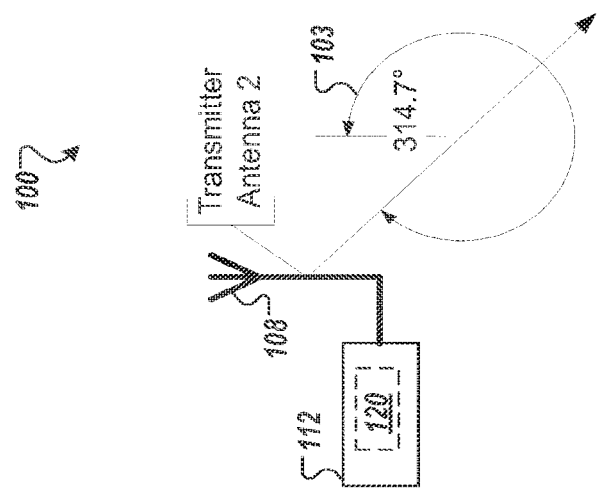

The embodiments described herein are directed to technology to estimate angle measurements for source tracking for phased array systems. As described above, source tracking refers to a procedure where an angle is determined between a single antenna and a phased array of multiple antennas in order to locate a source with respect to the phased array. Source tracking can be done 1) using a phased array at a receiver and a single antenna at a transmitter in a AoA configuration or 2) using a phased array at a transmitter and a single antenna at a receiver in a AoD configuration. AoA or AoD configurations may be interchangeable for the source-tracking estimation algorithm described herein. For ease of description, embodiments of the source-tracking estimation algorithm are set forth in terms of an AoA system, but in other embodiments, the source-tracking estimation algorithm can be used in an AoD system.

In one embodiment, a processing device includes a transceiver to transmit or receive radio frequency (RF) signals via a phased array antenna (multiple antenna elements) and a processor coupled to the transceiver. The processor executes a multi-angle source-tracking tool configured to determine and store a set of one or more angle estimation values of an angle between the phased array antenna and the second antenna, a set of confidence measurements, and at least one of an Area-of-Arrival (ARoA) value or an Area-of-Departure (ARoD) value based on the RF signals. It should be noted that ARoA may be inferred from multiple angle values and, in some cases, could be the same value as AoA. At any given point in time, the set of angle estimation values may have one or more values. Each of the set of confidence measurements indicates a confidence of an angle estimation value of the set of angle estimation values. The processing device may be part of a System on Chip (SoC) including the transceiver and a processor to process digital values representing the RF signals received or transmitted by the transceiver. The transceiver and the processor may reside on a common carrier substrate or may be implemented in separate integrated circuits.

The embodiments described herein may improve accuracy of the source tracking by using a weighted cost function metric. In addition, the embodiments described herein may provide additional indicators that would help track sources more intuitively and with more accuracy than just a simple angle value. The additional indicators may also help with localization accuracy. As described herein, the embodiments of the multi-angled source-tracking tool improve traditional source tracking methods in the following three operations: 1) The multi-angled source-tracking tool derives a running weighting function in a source-tracking algorithm and uses the weighting function to improve the AoA estimation accuracy by the source-tracking algorithm. The weighting of the AoA estimation indicates a quality metric (e.g., "goodness") of a current estimate. The weighting is used as feedback into the source-tracking algorithm to improve an accuracy of the AoA estimation. In one embodiment, the weighting is applied to Generalized Cross Correlation (GCC) based algorithm. In other embodiments, however, the weighting can be applied to other source-tracking algorithms, such as a MUltiple SIgnal Classification (MUSIC) algorithm, a Generalized Cross Correlation with Phase Transform (GCC-PHAT) algorithm, an ESPIRIT algorithm, or the like. 2) Unlike traditional source tracking methods, the multi-angled source-tracking tool can provide multiple angle estimation values with associated confidence measurements using a statistical model with a statistical classifier or a machine learning techniques using a classifier. The multi-angled source tracking tool can infer quality of the calculation to determine LOS, NLOS, and partial LOS, scenarios. This is called AoA/AoD scene analysis as described herein. For example, this may be done by angle scene modeling, such as AoA scene modeling, using Gaussian Mixture Models (GMM). Alternatively, other statistical modeling or machine learning techniques can be used. 3) The multi-angled source-tracking tool uses confidence measurements to report an ARea of Arrival (ARoA) value in cases of weak direct paths or non-existent direct paths between the phased array antenna and the second antenna.

Figure 3:
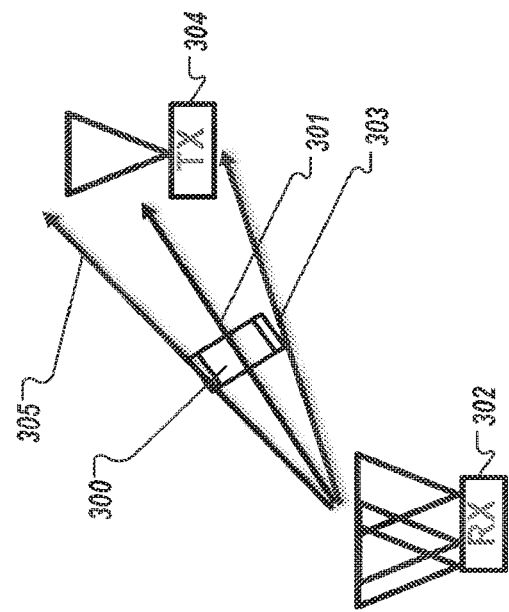
FIG. 3 illustrates an obstacle positioned between the phased array antenna and the second antenna according to one embodiment.

FIG. 1 is a block diagram illustrating a multi-angle source-tracking tool 120 to estimate angles between a phased array antenna and a second antenna in an AoA configuration 100 according to one embodiment. In the AoA configuration 100, a transmitter (Tx) antenna 102 at a transmitter (processing device 110) is tracked using multiple receiver (Rx) antennas 104 at a receiver (processing device 106). The transmitter, coupled to the Tx antenna 102, sends one or more signals with a known frequency in a pre-determined format that is received by the multiple Rx antennas 104 on the receiver side in a switched or simultaneous manner. The TX antenna 102 can be located at an angle 101 from the multiple RX antennas 104. Similarly, in the AoA configuration 100, a TX antenna 108 at a transmitter (processing device 112) is tracked using multiple RX antenna 104 at the receiver. The TX antenna 108 can be located at an angle 103 from the multiple RX antennas 104. The angles 101, 103 can be measured with a clockwise convention. Alternatively, the angles can be measured in a counter-clockwise convention. Also, the angles 101, 103 are illustrated as two dimensional in some figures, the angles 101, 103 are angles in three dimensional space. For example, the angle can be reported with different coordinate notations, such as azimuth and elevation. The processing device 106, using the relative magnitudes and phase differences in the signals received via the multiple Rx antennas 104, determine an angle 101 with known antenna models using a wave propagation model, such as a far field model (such as illustrated in FIG. 3). Although far field models are used in some of the embodiments below, other wave propagation models can be used. In one embodiment, the processing device includes a receiver or a transceiver that receives RF signals via the multiple Rx antennas 104 and converts these to digital values (also referred to as digital samples). Alternatively, a receiver can be used to receive RF signals via the multiple Rx antennas 104. The processing device 106 uses the multi-angle source-tracking tool 120 to process the digital values to estimate the angle 101 as described herein. For example, the multi-angle source-tracking tool 120 can implement an AoA estimation block that can perform a raw AoA estimation and a post-processing block that can perform some processing on the raw AoA estimation as described herein. The multi-angle source-tracking tool 120 can execute one or more source-tracking estimation algorithms in three primary operations, including estimating angles using a source-tracking algorithm, modeling the angles using a classifier using a statistical modeling or machine learning to provide multiple angle estimation values with associated confidence measurements, and determining an ARoA value with a confidence value from the multiple angle estimation values and corresponding confidence measurements. In some embodiments, the multi-angle source-tracking tool 120 can calculate a confidence value for the ARoA from the multiple angle estimation values and the corresponding confidence measurements. Additional details regarding the three primary operations are described below with respect to FIGS. 2-5. It should be noted that although in various embodiments described herein, the multi-angle source-tracking tool 120 is used in connection with a single antenna at one device and a phased array antenna at another device, in other embodiments, multiple antenna elements can be used regardless of whether they are being used in a phase array antenna configuration and both devices may have multiple antenna elements being used.

In one embodiment, the multi-angle source-tracking tool 120 determines and stores a single angle estimation value of an angle 101 between a phased array antenna (multiple Rx antennas 104) and a second antenna Tx antenna 102. For example, when there is a line of sight (LOS) between the phased array antenna and the second antenna, the single angle estimation value of angle 101 may have a high confidence as described herein. However, in some cases, such as when there is partial LOS or no LOS (NLOS), the multi-angle source-tracking tool 120 can determine and store multiple angle estimation values of an angle between the phased array antenna and the second antenna along with a set of confidence measurements. Each of the set of confidence measurements indicates a confidence of an angle estimation value of the set of angle estimation values. In a further embodiment, the multi-angle source-tracking tool 120 determines and stores at least one of an Area-of-Arrival (ARoA) value or an Area-of-Departure (ARoD) value, as described herein.

In another embodiment, the multi-angled source-tracking tool 120 derives a running weighting function in a source-tracking algorithm and uses the weighting function to improve the AoA estimation accuracy by the source-tracking algorithm. The weighting of the AoA estimation indicates a quality metric (e.g., "goodness") of a current estimate. The weighting is used as feedback into the source-tracking algorithm to improve an accuracy of the AoA estimation. In one embodiment, the weighting is applied to Generalized Cross Correlation (GCC) based algorithm. In other embodiments, however, the weighting can be applied to other source-tracking algorithms, such as the MUSIC algorithm, the GCC-PHAT algorithm, or the like.

Figure 2:
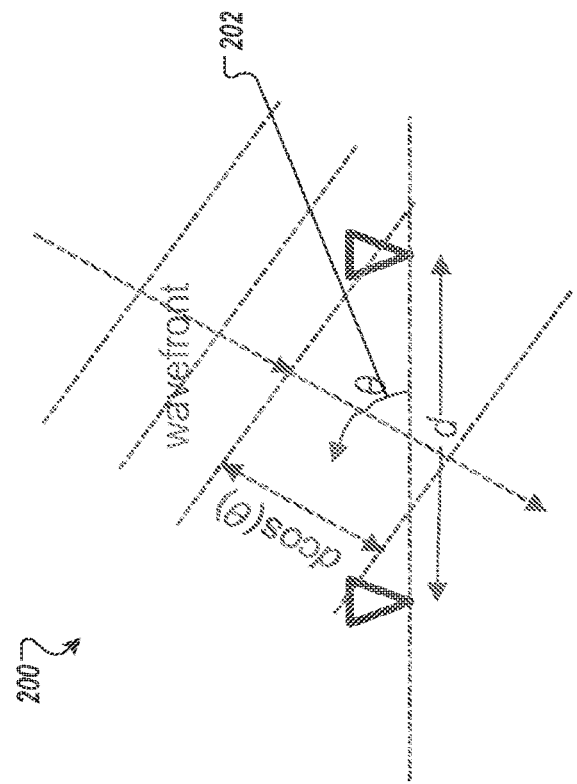
FIG. 2 illustrates a wave propagation model used to determine an angle between a phased array antenna and a second antenna according to one embodiment.

In one embodiment, to determine the set of angle estimation values and the set of confidence measurements, the multi-angle source-tracking tool 120 performs a source-tracking algorithm to obtain raw angle values based on digital samples of the RF signals. The multi-angle source-tracking tool 120, in performing an AoA or AoD estimation method, can define a steering vector to capture information coming from a certain direction using a wave propagation model. The multi-angle source-tracking tool 120 use the steering vector in conjugation with signals obtained on the antennas to search along all directions to find the angle (e.g., AoA or AoD). The relation of wave propagation in a direction is illustrated in FIG. 2. FIG. 2 illustrates a wave propagation model 200 used to determine an angle 202 between a phased array antenna and a second antenna according to one embodiment. For example, a distance between different elements of the phased array may be a known distance, d. The magnitude and phase differences at the different elements can be used to determine an effective distance between waves at the two elements, as represented by $d \cos(\theta)$. The effective distance between waves can be used to determine the angle 202 ($\theta$).

Some source-tracking algorithm described herein may include a GCC based algorithm, a GCC-PHAT algorithm, a MUSIC algorithm, or the like. In some embodiments, these algorithms are modified by a cost function. The cost function can weigh the raw angle values to improve an accuracy of the source-tracking algorithm. For example, the mathematical formulation for the GCC-PHAT for a circular array is given in the following equation (1):

$$(\theta_s, \varnothing_s) = \max_{(\theta, \varnothing)} \sum_{i,k} \frac{E[R_{ik}]e^{-j\omega\tau_{ik}}}{|E[R_{ik}]|} \; \forall \, \theta \in [-180, 180), \varnothing \in [0, 90]$$

where i=1 ... M−1, k=i+1 M and
$\tau_{ik}=(\tau_i-\tau_k)$ where $\tau_i=(r_i/c)\cos(\theta_i-\theta)\cos(\varnothing_i-\varnothing)$;
$(r_i, \theta_i, \varnothing_i)$: polar coordinates for antenna i; c: wave speed
$R_{ik}$ is the cross-correlation between for the microphone pair i, k at frequency $\omega$ In another embodiment, the modified GCC-PHAT, i.e., the GCC-PHAT algorithm with the cost function can be used to lower complexity, but maintain reasonable performance. The GCC-PHAT estimation is expressed in the following equation (2):

$$(\theta_s, \varnothing_s)_m = (1-C)(\theta_s, \varnothing_s)m + C(\theta_s, \varnothing_s) \text{ where } C = f\left(\max_{(\theta, \varnothing)} \frac{E[R_{12}]e^{-j\omega\tau_{12}}}{|E[R_{12}]|}\right)$$

As set forth in the following Table 1, the cost function can improve the accuracy of the source-tracking algorithm.

| Source tracking method | Estimated AoA for LOS scenario | | |
|---|---|---|---|
| | (EstAoA_0deg_SOL) | (EstAoA_35deg_SOL_end_drive_way) | (cpm_outdoor_1) |
| MODIFIED GCC-PHAT | −4.7 ± 2 | −40.2 ± 2.2 | 50.9 ± 22.5 |
| GCC-PHAT | −5.7 ± 5.7 | −41.2 ± 446.1 | 44.9 ± 377.5 |

Alternatively, other improvements may be achieved using the cost function. Also, in other embodiments, the cost function may not be used in connection with other features that result in improvements to the process in other ways.

In case of Non-Line-Of-Sight (NLOS) or partial NLOS, a source-tracking algorithm may point to the wrong direction or constantly switch between two or more angles as a result of the NLOS or partial NLOS. Both scenarios result in inaccurate estimations and can be unacceptable, annoying, or both. This scenario may have high estimation or localization error. This scenario is illustrated in the embodiment of FIG. 3. It should be noted the wave propagation model 200 is one of many propagation models that can be used.

FIG. 3 illustrates an obstacle 300 positioned between a phased array antenna 302 and a second antenna 304 according to one embodiment. The obstacle 300 may be any object that causes a NLOS or partial NLOS scenario in which an angle 301 becomes more challenging to determine. The source-tracking algorithm could result the estimation of the angle 301 to be a first angle 303 that is not the correct angle. Or the source-tracking algorithm could result in constant or periodic switching between the first angle 303 and a second angle 305, which is also not the correct angle. The multi-angle source-tracking tool 120 can determine both the first angle 303 and the second angle 305 and corresponding confidence measurements to better estimating the angle 301 as described in more detail below. In particular, the multi-angle source-tracking tool 120 can determine and report an area between multiple angles (e.g., an area defined between angle 303 and angle 305) instead of just an angle that is incorrect or one that toggles between two different angles in an annoying way. Also, although the area is illustrated in two dimensions, there may be a third azimuth angle that contributes to the calculation. It should be noted that the obstacle may be an object, as well as a wall. Alternatively, the non-direct path may be a result of a room with certain wall shapes that cause signals to bounce around in the room and make the non-direct path stronger.

Referring back to FIG. 1, the one more angle estimations determined above can be further refined using post processing. To provide distinction, the first estimation may be termed as raw estimation and the final estimation (or expected estimation) is published after post processing. In one embodiment, the post processing may include Kalman filtering. In other embodiment, once the raw angle values have been obtained, the multi-angle source-tracking tool 120 can perform angle scene modeling on the raw angle values, such as AoA scene modeling or AoD scene modeling. In one embodiment, the multi-angle source-tracking tool 120 can statistically model the raw angles with a classifier. In another embodiment, the multi-angle source-tracking tool 120 can statistically model the raw angle values with a GMM to obtain one or more mixtures, each mixture of the including GMM parameters including weights, mean, and variance values. In another embodiment, the multi-angle source-tracking tool 120 can model raw angle values using machine learning algorithms to classify and use internal parameters to derive confidence measures. The multi-angle source-tracking tool 120 can estimate an expected angle value for each of the mixtures from the GMM parameters (or other ML parameters) to obtain the set of angle estimation values of the angle between the phased array antenna 104 and the second antenna 102. The multi-angle source-tracking tool 120 can calculate a confidence measurement for each of the set of angle estimation values of the multiple mixtures from the GMM parameters to obtain the set of confidence measurements.

Unlike traditional source tracking methods, the multi-angled source-tracking tool 120 can provide multiple angle estimation values with associated confidence measurements using a statistical model with a statistical classifier (or classifier in machine learning). For example, this may be done by angle scene modeling, such as AoA scene modeling, using Gaussian Mixture Models (GMM) or machine learning. Alternatively, other statistical modeling can be used.

The multi-angled source-tracking tool 120 uses confidence measurements to report an ARea of Arrival (ARoA) value in cases of weak direct paths or non-existent direct paths between the phased array antenna 104 and the second antenna 102. The ARoA value or the ARoD value may represent an angled area in a general direction between the phased array antenna 104 and the second antenna 102. The configuration in FIG. 1 is an AoA configuration. Alternatively, other configurations are possible. For example, an angle estimation value of the set of angle estimation values is at least one of an AoA value, an AoD value, a Time-Delay-of-Arrival (TDoA) value, a Time-Delay-of-Departure (TDoD) value, a Direction-of-Arrival (DoA) value, or a Direction-of-Departure (DoD) value. AoA or AoD systems employ multiple antennas at the receiver or transmitter side to track a target. The AoA and AoD source-tracking methods are interchangeable. For simplicity of presentation, various embodiments are described herein with respect to AoA systems.

In a further embodiment, the multi-angled source-tracking tool 120 determines an overall confidence measurement from the set of confidence measurements.

Figure 4:
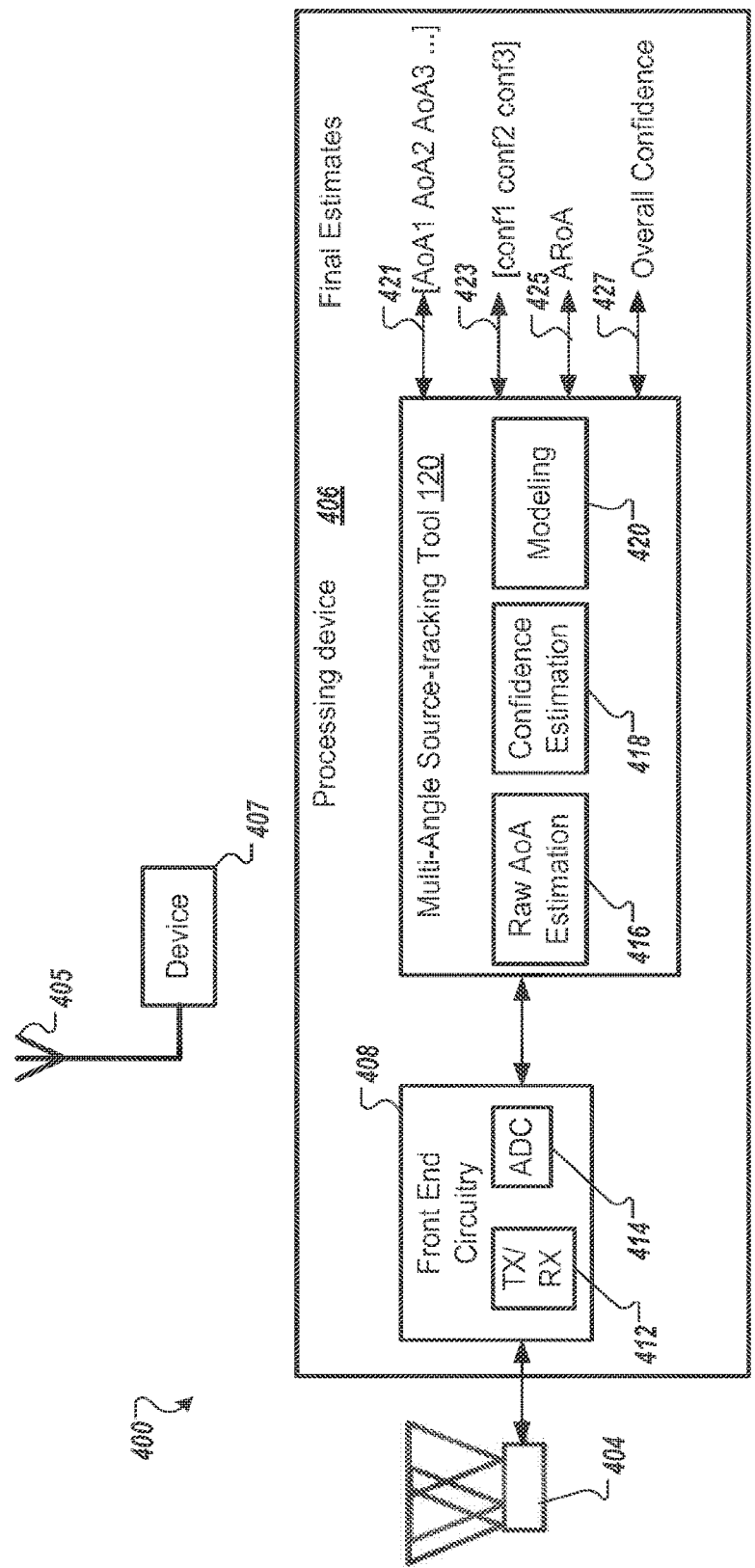
FIG. 4 is a block diagram of a processing device with a multi-angle source-tracking tool to estimate angles between a phased array antenna and a second antenna according to one embodiment.

FIG. 4 is a block diagram of a processing device 406 with a multi-angle source-tracking tool 120 to estimate angles between a phased array antenna 404 and a second antenna 405 according to one embodiment. The processing device 406 may be part of an electronic device 400 that includes a phased array antenna 404. The processing device 406 includes a front-end circuitry 408 coupled to the phased array antenna 404. The front-end circuitry 408 may include a transceiver 412 and an analog-to-digital converter (ADC) 414. The transceiver 412 is configured to couple to the phased array antenna 404 to transmit or receive RF signals to or from a second antenna 405 of a second device 407. The processing device 406 may include a processor that is coupled to the front-end circuitry 408 to process digital values representing the RF signals. The processor may implement the multi-angle source-tracking tool 120, as described herein. The processor can be an application processor, a host processor, a microcontroller, a microprocessor, or other processing component. In one embodiment, the processor obtains a raw angle sample and updates a statistical model with the raw angle sample. The processor identifies one or more angle scenarios from the statistical model using a statistical classifier. The processor determines an estimated angle value for each of the one or more angle scenarios from the statistical model and calculates a confidence value for the estimated angle value for each of the one or more angle scenarios from the statistical model. When the confidence value for the estimated angle value for the one or more angle scenarios is less than the confidence threshold, the processor 1) estimates a number of multipaths between the phased array antenna and the second antenna from the one or more angle scenarios, 2) estimates an angled area between the phased array antenna 404 and the second antenna 405 from the estimated angle values and the corresponding confidence values to obtain an estimated angled area value, and 3) reports the number of multipaths and the estimated angled area value.

In a further embodiment, the processor reports the estimated angle value when the confidence value for the estimated angle value for the one or more angle scenarios is equal to or greater than the confidence threshold. In another embodiment, the processor obtains a second raw angle sample and updates the statistical model with the second raw angle sample.

In a further embodiment, to obtain the raw angle sample, the processor performs a source-tracking algorithm to obtain the raw angle sample. The source-tracking algorithm includes a cost function to weight the raw angle sample to improve an accuracy of the source-tracking algorithm. To update the statistical model with the raw angle sample and to identify the one or more angle scenarios from the statistical model using the statistical classifier, the processor updates a GMM to obtain one or more mixtures, each mixture including GMM parameters including a weight, a mean, and a variance. Alternatively, the processor can update other statistical models.

In another embodiment, to determine the estimated angle value for each of the one or more angle scenarios from the statistical model, the processor estimates an expected angle value for each of mixtures from the GMM parameters to obtain a set of angle estimation values corresponding to the number of multipaths between the phased array antenna 404 and the second antenna 405. To calculate the confidence value for the estimated angle value for each of the one or more angle scenarios from the statistical model, the processor calculates a confidence measurement for each of the one or more mixtures from the GMM parameters to obtain a set of confidence measurements corresponding to the set of angle estimation values. In one embodiment, the estimated angle value is at least one of an Angle-of-Arrival (AoA) value. In another embodiment, the estimated angle value is an Angle-of-Departure (AoD) value. Alternatively, the estimated angle value may be a Time-Delay-of-Arrival (TDoA) value, a Time-Delay-of-Departure (TDoD) value, a Direction-of-Arrival (DoA) value, or a Direction-of-Departure (DoD) value. In one embodiment, the estimated angled area value is at least one of an Area-of-Arrival (ARoA) value. Alternatively, the estimated angled area value is an Area-of-Departure (ARoD) value.

As depicted in FIG. 4, the processor can report multiple AoA values 421 and corresponding confidence measurements 423. The processor can report the ARoA 425 and an overall confidence measurement 427. In one embodiment, the processor implements a multi-angled source-tracking tool 120 that includes a raw AoA estimation block 416, a confidence estimation block 418, and a modeling block 420. Modeling block 420 can be a statistical modeling block, a machine-learning modeling block, or any combination thereof. The raw AoA estimation block 416 can define a steering vector to capture information coming from a certain direction using a wave propagation model. The raw AoA estimation block 416 can use this steering vector in conjugation with signals obtained on the phased array antenna 404 to search all directions to find the AoA estimate. This may be considered an initial estimate as compared to the final estimates reported (e.g., 421, 423, 425, and 427). The raw AoA estimation block 416 can use GCC, MUSIC, or the like in this initial AoA estimate. Traditional solutions would then just perform some post processing, like Kalman filtering, to estimate the AoA. The embodiments described herein perform different post processing as set forth in the confidence estimation block 418 and the statistical modeling block 420. It should be noted again that although AoA estimation is being used for the description, in other embodiments, blocks 416, 418, and 420 can be used for AoD or other estimation methods.

A traditional (state-of-the-art) solution for source tracking method employs one or two state process and provides one directional estimate per antenna pair. The embodiments of the multi-angle source-tracking tool 120 improve the traditional AoA estimation in multiple ways. The multi-angle source-tracking tool 120 may improve the raw AoA estimation store from the raw AoA estimation block 416 by using a weighted cost function metric. Unlike traditional AoA estimation, the multi-angle source-tracking tool 120 provides multiple angles 421 with associated confidence measurements 423 by AoA scene modeling, such as using GMM. The multi-angle source-tracking tool 120 further uses confidence measurements 423 to provide ARoA 425 in the case weak (non-existent) direct path between the phased array antenna 404 and second antenna 405. In some embodiments, the multi-angle source-tracking tool 120 provides additional indicators that would help with the source tracking scenario in addition to improving accuracy of the core source tracking algorithm. The additional information may include multiple AoAs 421 (or AoDs) along with associated confidence measurements 423. It may also report the overall confidence measurement 427 that could be used to decide if the published direction should use AoA or ARoA. In a Line-Of-Sight (LOS) scenario, the AoA with highest confidence is used. In a partial LOS or NLOS scenarios, ARoA is used that is calculated from multiple AoAs 421 and their confidence measurement 423. In one embodiment, the ARoA may be reported as two angles plus a confidence measurement where a space between the two angles is referred to as the area. Alternatively, multiple ARoA values may be reported, each with disparate confidence measures. As described herein, the ARoA may have overall confidence measurement 427 or the overall confidence may be inferred from individual confidence measurements of the multiple estimated angle values.

The multi-angle source-tracking tool 120 uses source-tracking algorithms with cost function weighting and some post processing to estimate multiple AoAs 421, confidence measurements 423, and ARoA 425. The multi-angle source-tracking tool 120, as a first operation, performs the raw AoA estimation by the raw AoA estimation block 416. The raw AoA estimation block 416 derives a running weighting function and uses it to improve the AoA estimation accuracy. The weighting indicates the quality metric of the current estimate which is used as a feedback for improving the accuracy of the source tracking algorithm. For example, the formulation of the GCC-PHAT without the cost function can be expressed in the following equation (3):

$$(\theta_s, \phi_s) = \max_{(\theta, \phi)} \sum_{i,k} \frac{E[R_{ik}]e^{-j\omega\tau_{ik}}}{|E[R_{ik}]|} \; \forall \theta \in [-180, 180), \phi \in [0, 90],$$

where i=1 . . . M−1, k=i+1 . . . M and $\tau_i=(\tau_i-\tau_k)$ where $\tau_i=(r_i/c)\cos(\theta_i-\theta)$
$\cos(\phi_i-\phi)$;

$(r_i, \theta_i, \phi_i)$: polar coordinates for antenna i; c: wave speed;

$R_{ik}$ is the cross-correlation between for the microphone pair i, k at frequency ω

The raw AoA estimation block 416 uses cost function to weight the AoA estimation and thus improving the accuracy.

The modification provides lower complexity and reasonable performance. The complexity was lowered using fewer pairs and offset in performance due to fewer antenna pairs was compensated by including cost function weighting in the GCC-PHAT estimation. The weighting function calculation and modified estimate is expressed in the following equation (4):

$$(\theta_s, \phi_s)_m = (1 - C)(\theta_s, \phi_s)_m + C(\theta_s, \phi_s),$$

$$\text{where } C = f\left(\max_{(\theta, \phi)} \frac{E[R_{12}]e^{-j\omega\tau_{12}}}{|E[R_{12}]|}\right)$$

The improvements in the results with the modified GCC-PHAT compared to the GCC-PHAT without the cost function are shown below in Table 1:

TABLE 1

| Source Tracking | Estimated AoA for LOS scenario | | |
|---|---|---|---|
| Algorithm | (EstAoA_0deg_SOL) | (EstAoA_35deg_SOL) | (cpm_outdoor_1) |
| Modified GCC-PHAT with Cost Function | −4.7 ± 2 | −40.2 ± 2.2 | 50.9 ± 22.5 |
| GCC-PHAT without cost function | −5.7 ± 5.7 | −41.2 ± 446.1 | 44.9 ± 377.5 |

As shown in Table 1, the variance was reduced significantly using the modified GCC-PHAT with cost function, as compared to the GCC-PHAT without cost function. The variance can be a key factor in source tracking. In the above description, the weighting was applied to GCC-based algorithm, however, this could be extended to other source tracking methods such as MUSIC in a similar manner in other embodiments.

After obtaining the raw AoA/AoD values by the raw AoA estimation block 416, the post processing is applied to obtain multiple AoAs and confidence measures from the raw AoA values. For this purpose, the statistical/machine learning modeling block 420 can use GMMs to model the raw AoA estimation values. In one embodiment, the post processing algorithm of the statistical modeling block 420 identifies the scene by decomposing the raw estimates into multiple scenes, including direct path, strong reflection, and noise. A typical example with three GMMs is shown in FIG. 5.

Figure 5:
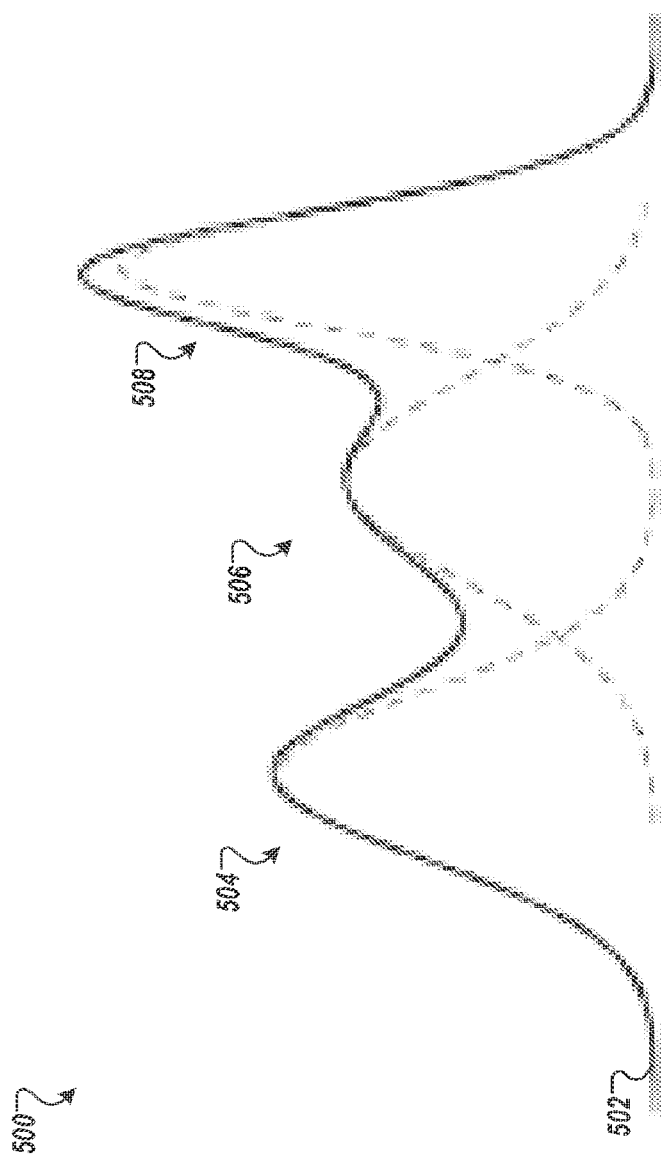
FIG. 5 is a graph illustrating three mixtures of a Gaussian Mixture Model (GMM) for modeling raw AoA estimation values according to one embodiment.

FIG. 5 is a graph 500 illustrating three mixtures of a Gaussian Mixture Model (GMM) for modeling raw AoA estimation values according to one embodiment. The graph 500 includes the raw AoA estimation values 502 that are statistically modeled into a first mixture 504, a second mixture 506, and a third mixture 508.

In GMM, the algorithm assumes that the sufficient statistics comes out from the source tracking algorithm. In one embodiment, the post processing algorithm identifies the scene by decomposing the raw estimates into multiple scenes—direct path, strong reflection and noise with the following equation (5):

$$p(y_i) = \sum_{j=1}^{N} w_j p(y_i | m_j) = \sum_{j=1}^{N} w_j N(y_i | \mu_j, \Sigma_j)$$

Adaptation can be done using an Expectation Maximization (EM) algorithm. For example, each Gaussian mixture model ($m_j$, $j=1, 2, 3$) at time n is represented by three parameters—weight ($w_{n,j}$), mean ($\mu_{n,j}$) and variance ($\Sigma_{n,j}$). These parameters are adapted using raw values say ($y_n$) at time n using an exemplary Expected Maximization algorithm as shown in the equation (6) below:

$$\mu_{n,j} = (1 - \alpha_{n,j})\mu_{n-1,j} + \alpha_{n,j}y_{n,j}$$

$$\sum_{n,j} = (1 - \alpha_{n,j})\left(\sum_{n-1,j} + \mu_{n-1,j}\mu_{n-1,j}^T\right) + \alpha_{n,j}y_{n,j}y_{n,j}^T - \mu_{n,j}\mu_{n,j}^T$$

$$\pi_{n,j} = [(1 - \alpha_{n,j})\pi_{n-1,j} + \alpha_{n,j}]/\lambda_{n,j}$$

where:

$$\alpha_n = \frac{P(DP \mid y_n)P(m_j \mid y_n)}{\theta_{n,j} + \tau}$$

$$\theta_{n,j} = \sum_{k=1}^{n} P(m_j \mid y_k)$$

$$\lambda_{n,j} = \sum_i \pi_{n,i}$$

$\tau$=relevance factor used to emphasize the model prior

At time n, the confidence measurement and estimated AoAs 421 for each mixture is estimated from the GMM parameters for each new sample by the confidence estimation block 418. Confidence measurement 423 for mixture k at time n is calculated from the prior/variance of the mixture k. Generally speaking, narrower the mixture, the better the confidence and higher the prior, the better is the confidence measurement 423. An example of the confidence calculation is expressed in the following equation (7):

$$W\{AoA \mid k_n\} = \frac{Conf\{k_n\} = f(w_{n,k}, \Sigma_{n,k})}{\sum_{j=1}^{3} E\{AoA \mid m_j\}P(m_j \mid k_n) = \frac{\sum_{j=1}^{3} w_j P(k_n \mid m_j) E\{AoA \mid m_j\}}{\sum_{l=1}^{3} w_l P(k_n \mid m_l)}}$$

Once the confidence measurements 423 are obtained, further evaluation is done to establish overall confidence measurement 427 and ARoA value 425. The multi-angle source-tracking tool 120 can report the multiple AoA estimation values 421, the corresponding confidence measurements 423, an ARoA 425, an overall confidence measurement 427, or any combination thereof. The processor or a separate host processor can use this information in source tracking applications.

Figure 6:
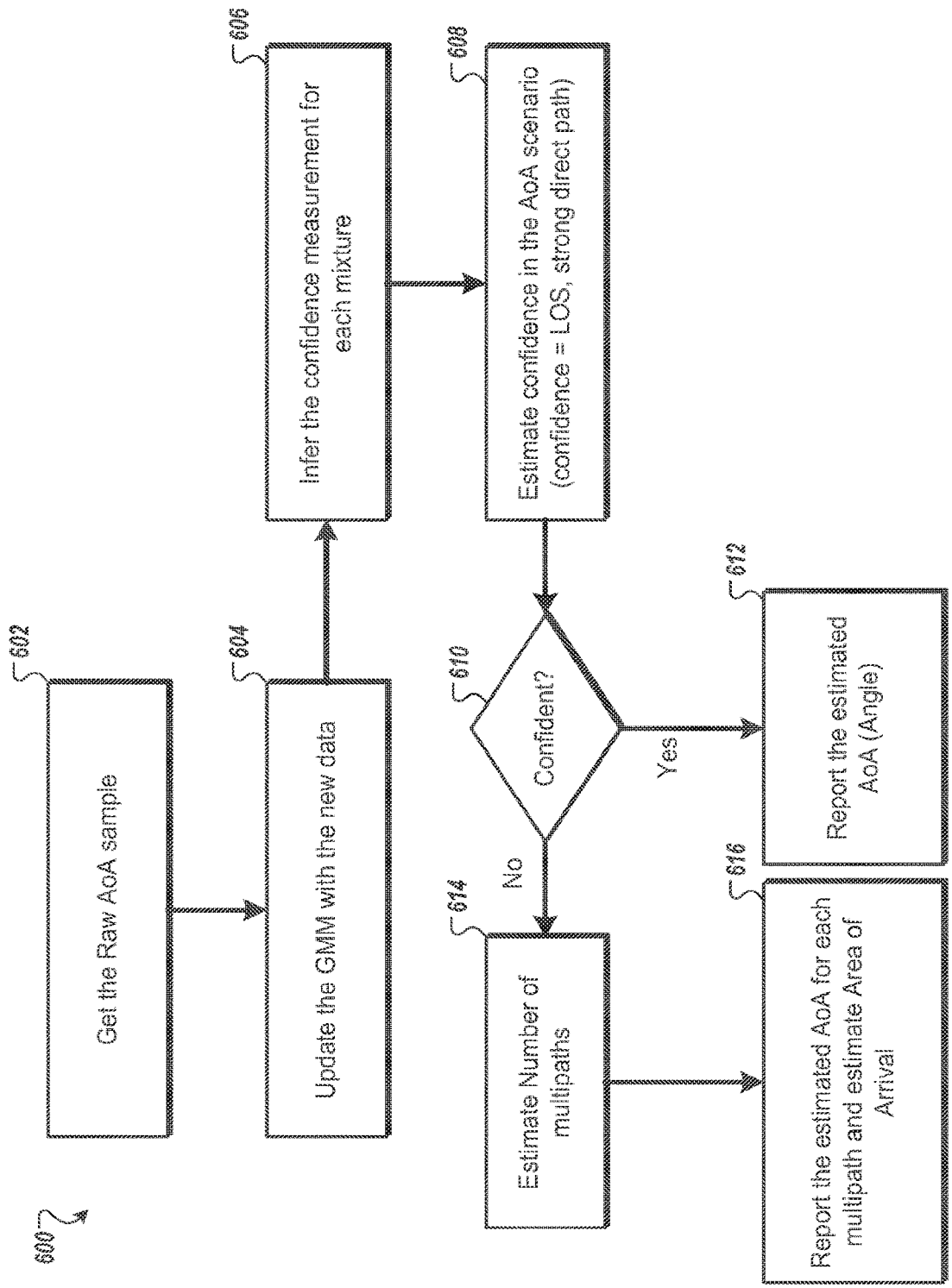
FIG. 6 is a flow diagram of a method of estimating angles between a phased array antenna and a second antenna according to one embodiment.

FIG. 6 is a flow diagram of a method of estimating angles between a phased array antenna and a second antenna according to one embodiment. The method 600 can be performed by processing logic comprising hardware (circuitry, dedicated logic, etc.), software (such as is run on a general purpose computing system or a dedicated machine), firmware (embedded software), or any combination thereof. In one embodiment, the processing logic of the processing device 106 of FIG. 1 performs the method FIG. 6. In another embodiment, the processing logic of the multi-angled source-tracking tool 120 of FIG. 1 performs the method 600. Alternatively, processing logic of the source devices with the multi-angled source-tracking tool 120 can perform some or all of the method 600.

At block 602, processing logic may obtain raw angle samples from RF signals transmitted or received by a phased array antenna (block 602). The processing logic updates a statistical model with the raw angle samples (block 604), such as by updating the GMM with the new data. The processing logic identifies one or more angle scenarios from the statistical model (or machine learning) using a statistical classifier and determines an estimated angle value for each of the one or more angle scenarios from the statistical model. The processing logic calculates a confidence value for the estimated angle value for each of the one or more angle scenarios from the statistical model (block 606). For example, a confidence measurement may be inferred for each mixture of the GMM. The processing logic can also calculate an overall confidence measurement in the AoA scenario (block 608). For example, a high confidence may suggest a LOS scenario or a strong direct path scenario.

At block 610, the processing logic determines the possibility of the estimated angled being reasonably close to the tracked device. In another embodiment, at block 610 the processing logic may estimate the angle to be reasonably close to the tracked device. When the confidence measurement exceeds the confidence threshold at block 610, the processing logic reports the estimated AoA with high confidence (block 612). If the confidence measurement does not exceed the confidence threshold at block 610, the processing logic estimates a number of multipaths between the phased array antenna and the second antenna from the one or more angle scenarios (block 614). The processing logic estimates an angled area between the phased array antenna and the second antenna from the estimated angle values and the corresponding confidence values to obtain an estimated angled area value and reports the estimated angled value for each multipath and the estimated ARoA (block 616). In another embodiment, a confidence is associated with the estimated ARoA In a further embodiment, the method 600 can be repeated and the processing logic can obtain a second raw angle sample and update the model with the second raw angle sample.

In one embodiment, the processing logic at block 602 can obtain the raw angle sample by performing a source-tracking algorithm to obtain the raw angle sample. This source-tracking algorithm may include a cost function to weight the raw angle sample to improve an accuracy of the source-tracking algorithm. In one embodiment, the processing logic at block 604 can update the GMM by updating a GMM to obtain multiple mixtures, each mixture having GMM parameters including a weight, a mean, and a variance. The source-tracking algorithm can be at least one of a GCC based algorithm that is modified by a cost function to weight the raw angle sample, a GCC-PHAT) algorithm that is modified by the cost function, a MUSIC algorithm that is modified by the cost function, or the sample.

In another embodiment, the processing logic at blocks 614, 616, the processing logic determines the estimated angle value by estimating an expected angle value for each of the mixtures from the GMM parameters to obtain a set of angle estimation values corresponding to the number of multipaths between the phased array antenna and the second antenna. The processing logic calculates the confidence value by calculating a confidence measurement for each of the mixtures from the GMM parameters to obtain a set of confidence measurements corresponding to the set of angle estimation values. The processing logic reports the set of angle estimation values and the set of confidence measurements. The set of angle estimation values may be AoA values, AoD values, TDoA values, TDoD values, DOA values, or DoD values as described herein. The processing logic can also compute and report an estimated ARoA or other angled area values as described herein. The angled area values may be ARoA values or ARoD values as described herein.

The embodiments described herein can provide additional information that would be useful in the case of multipath, partial/non LOS. In the following example, a scenario is presented where the traditional system would choose an AoA arbitrarily in the presence of multipath. On the other, the embodiments described herein would infer that the estimation is not confident and the angle is further processed to specify ARea-of-Angle which would help when combined with other measures.

As described herein, source tracking refers to a procedure where an angle is determined between a single antenna and a phased array antenna (with multiple antenna elements). The source tracking can be done using a phased array antenna at a receiver and a single antenna at a transmitter. This configuration is known as Angle-of-Arrival (AoA) configuration shown in FIG. 7A. On the other hand, if the phased array antenna is at a transmitter and a single antenna is at a receiver, the configuration is known as Angle-of-Departure (AoD) configuration as shown in FIG. 7B. The source-tracking algorithm remains the same between AoA and AoD. Sometimes, AoA is also referred to as Direction-of-Arrival (DoA) or Time-Delay of Arrival (TDoA). Time-delay and angle are related, therefore, the information deduced is equivalent. There are many source tracking methods available. Some of the popular ones are beamforming (where beams are created in different directions and energy is monitored), Generalized-Cross-Correlation (GCC), MUltiple SIgnal Classification (MUSIC) etc. The cost function in the GCC algorithm can be normalized in different ways to create different flavors of the algorithm. One of the popular one is GCC-PHAT where the cost function is normalized by magnitude.

Figure 7A:
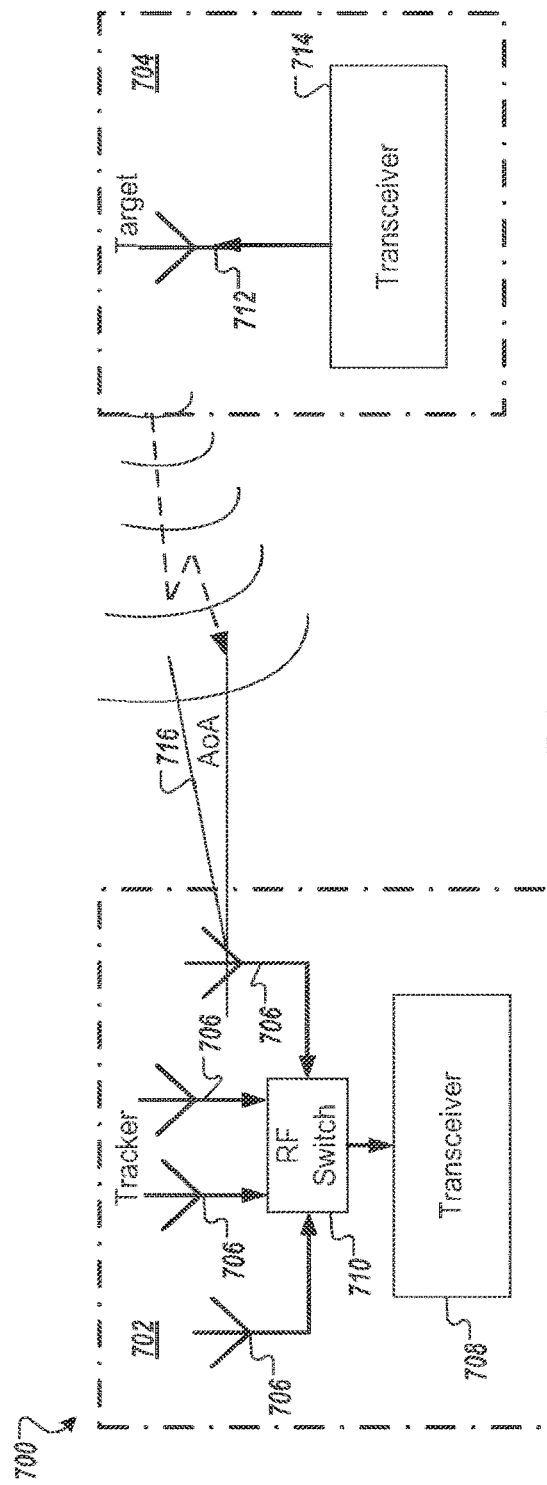
FIG. 7A is a block diagram illustrating an Angle-of-Arrival (AoA) configuration for a source-tracking algorithm of the multi-angle source-tracking tool according to one embodiment.
Figure 7B:
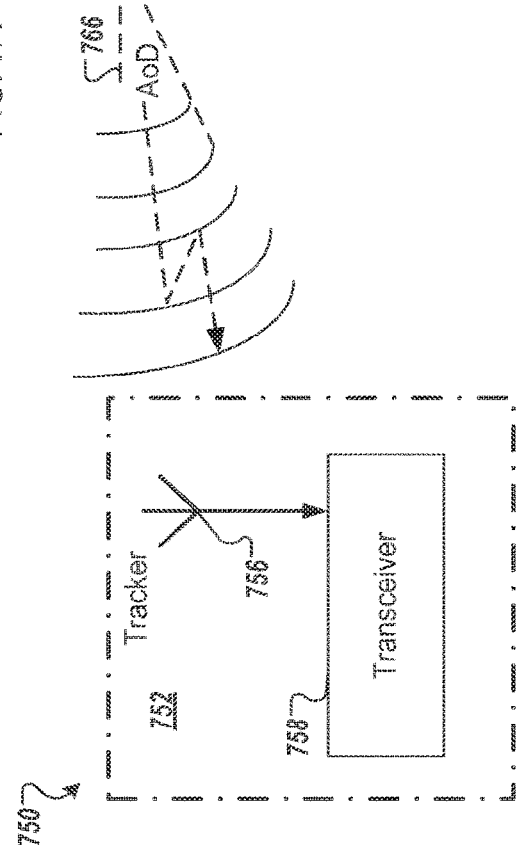
FIG. 7B is a block diagram illustrating an Angle-of-Departure (AoD) configuration for a source-tracking algorithm of the multi-angle source-tracking tool according to one embodiment.

FIG. 7A is a block diagram illustrating an Angle-of-Arrival (AoA) configuration 700 for a source-tracking algorithm of the multi-angle source-tracking tool 120 according to one embodiment. The AoA configuration 700 includes a tracker device 702 and a target device 704. The tracker device 702 includes a transceiver 708 coupled to an RF switch 710, which is coupled to multiple antenna elements 706 organized in a phased array antenna. The target device 704 includes a transceiver 714 coupled to a single antenna 712. The transceiver 714 communicates RF signals via the single antenna 712 and the transceiver 708 receives RF signals via the antenna elements 706. The multi-angle source-tracking tool 120 at the tracker device 702 can estimate an AoA value 716 based on the RF signals as described herein.

FIG. 7B is a block diagram illustrating an Angle-of-Departure (AoD) configuration 750 for a source-tracking algorithm of the multi-angle source-tracking tool 120 according to one embodiment. The AoD configuration 750 includes a tracker device 752 and a target device 754. The tracker device 752 includes a transceiver 758 coupled to a single antenna 756. The target device 754 includes a transceiver 762 coupled to an RF switch 764, which is coupled to multiple antenna elements 760 organized in a phased array antenna. The transceiver 762 communicates RF signals via the multiple antenna elements 760 and the transceiver 758 receives RF signals via the single antenna 756. The multi-angle source-tracking tool 120 at the target device 754 can estimate an AoD value 766 based on the RF signals as described herein. It should be noted that FIG. 7B shows a single transceiver 762 with an RF switch 764, in other embodiments, multiple transceivers can be coupled to multiple antennas without an RF switch.

Figure 8:
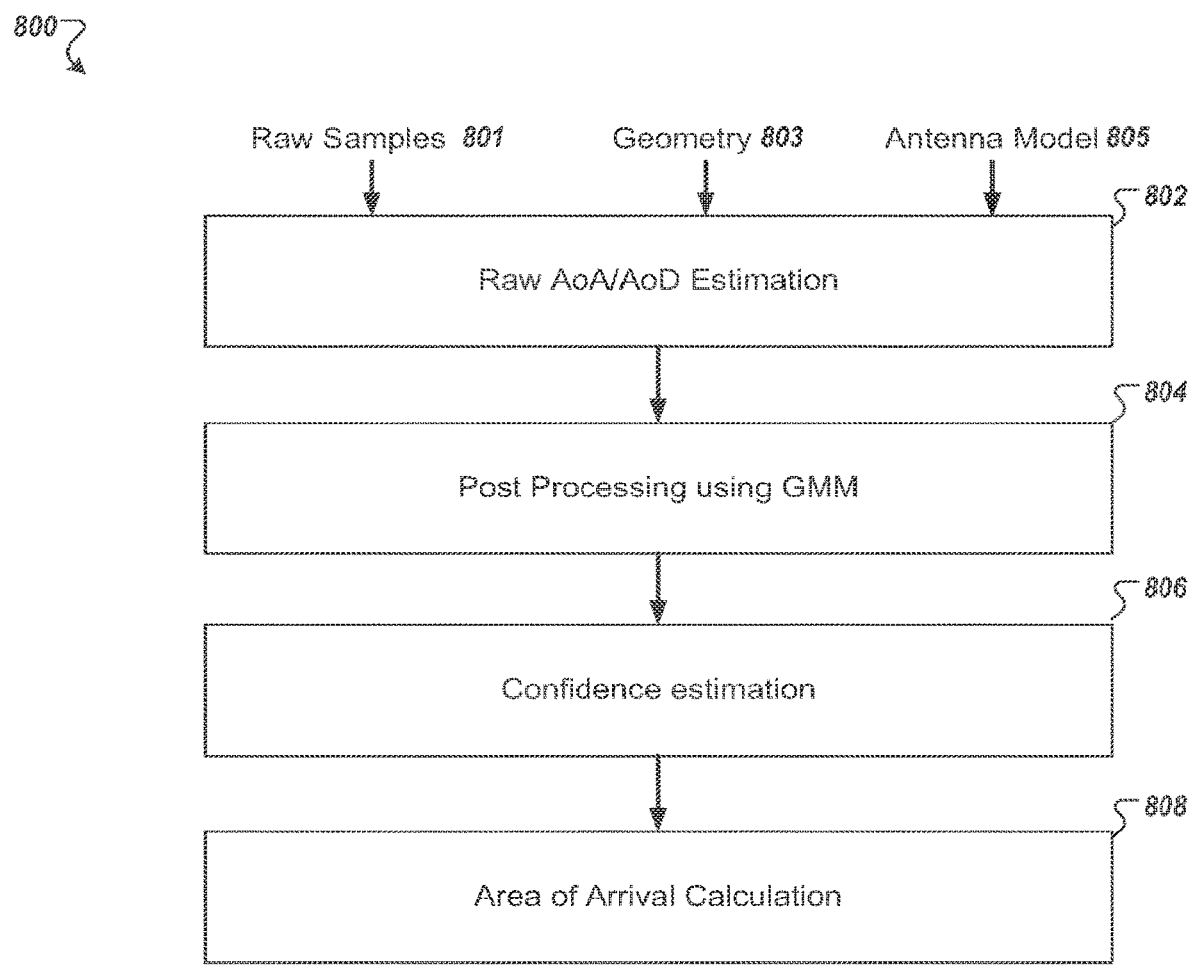
FIG. 8 is a flow diagram of a multi-angle source-tracking method with confidence estimation and Area-of-Angle estimation according to one embodiment.

FIG. 8 is a flow diagram of a multi-angle source-tracking method 800 with confidence estimation and Area-of-Angle estimation according to one embodiment. The method 800 can be performed by processing logic comprising hardware (circuitry, dedicated logic, etc.), software (such as is run on a general purpose computing system or a dedicated machine), firmware (embedded software), or any combination thereof. In one embodiment, the processing logic of the processing device 106 of FIG. 1 performs the method 800. In another embodiment, the processing logic of the multi-angled source-tracking tool 120 of FIG. 1 performs the method 800. Alternatively, processing logic of the source devices with the multi-angled source-tracking tool 120 can perform some or all of the method 800.

At block 802, processing logic may obtain raw angle samples 801 from RF signals transmitted or received by a phased array antenna or a single antenna. The processing logic may also receive geometry 803 of the phased array antenna and an antenna model 805 being used by an electronic device. The method may be based on the multiple antenna information (I/Q) and antenna geometry to estimate direction between two devices. At block 802, the processing logic determines initial estimates of the angle(s). At block 802, the processing logic performs a source-tracking algorithm with a cost function, as described herein. In one embodiment, the weighting by the cost function can be applied to improve accuracy. Similar improvements may be achieved if the cost function is used as a soft classifier to determine if the current statistics should be used in the source tracking. If a soft classifier is used, the performance could be close to the weighted cost function.

At block 804, the processing logic performs some post processing using GMM. At block 806, the processing logic performs confidence estimation to obtain confidence measurements corresponding to the estimated angle values in block 802. The cost function weighting, statistical modeling using GMM and confidence estimation using the GMM parameters can be used to achieve improved performance. In one embodiment, where GMMs are used to determine confidence measures, another statistical classifier, such as regression, neural networks, or the like, can be used. Parameters from these classifiers could be used to infer confidence measurements.

At block 808, the processing logic performs ARoA calculation based on the AoA/AoD estimation values and the corresponding confidence measurements.

The "good enough" performance (e.g., quality metric) can be achieved if soft classifiers or weights are replaced by hard classifiers. The embodiments described herein may improve raw Angle estimation accuracy. In addition, the embodiments described herein may provide additional information to solve Angle Of Arrival in difficult scenarios, which may be considered unsolvable currently. It should be noted that a similar method could be performed using machine learning.

Figure 9:
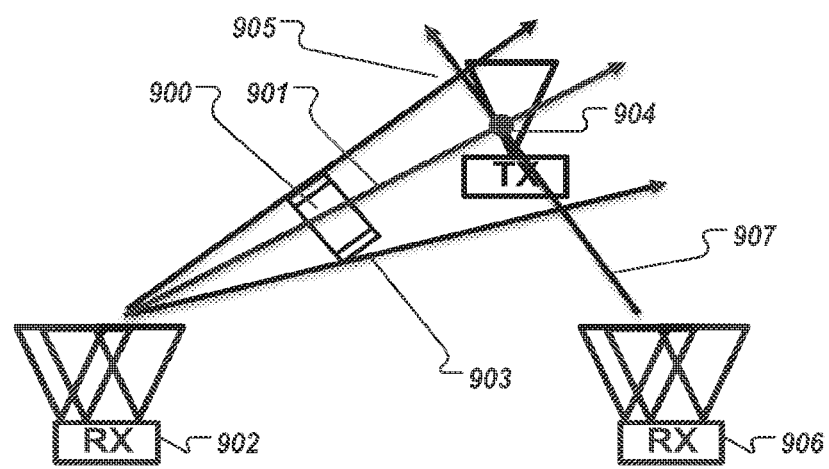
FIG. 9 illustrates an obstacle positioned between the phased array antenna and the second antenna according to another embodiment.

FIG. 9 illustrates an obstacle positioned between a phased array antenna 902 and a second antenna 904 according to another embodiment. The obstacle 900 may be any object that causes a NLOS or partial NLOS scenario in which an angle 901 becomes more challenging to determine. The source-tracking algorithm could result the estimation of the angle 901 to be a first angle 903 that are not the correct angles. Or the source-tracking algorithm could result in constant or periodic switching between the first angle 903 and a second angle 905, which is also not the correct angle. The multi-angle source-tracking tool 120 can determine both the first angle 903 and the second angle 905 and corresponding confidence measurements to better estimating the angle 901 as described herein. In particular, the multi-angle source-tracking tool 120 can determine and report multiple angles (903, 905) instead of just an angle that is incorrect or one that toggles between two different angles in an annoying way.

In the embodiment of FIG. 9, a second phased array antenna 906 and the second antenna 904 can have a LOS scenario that is not blocked by the obstacle 900. An angle 907 between the second phased array antenna 906 and the second antenna 904 can be determined. The angle 907 can be used in connection with the estimated angle 901 for source tracking. The angle 907 and its confidence are combined with angle values from 902 to localize the target device. The combination can be done by one of the tracker devices by communicating with other tracker devices or by another devices that is communicating to all tracker devices over a known channel, such as via a personal area network or wireless local area network.

The embodiments described herein may be implemented in an electronic system including a processing device that may perform the same or similar functions as described with respect the above figures, and vice versa. In another embodiment, the processing device may be a microprocessor or a microcontroller. The multi-angle source-tracking tool 120 can be implemented as firmware executing on the microcontroller or microprocessor. The microcontroller may report the estimates described herein to an application processor. The electronic system may include a host processor for a computer system that utilizes the microcontroller to provide the estimates described herein. The host processor may include one or more processing devices, a memory, and other hardware or software components that perform operations for the electronic system.

The processing device may include analog and or digital general purpose input/output ("GPIO") ports. GPIO ports may be programmable. GPIO ports may be coupled to a Programmable Interconnect and Logic ("PIL"), which acts as an interconnect between GPIO ports and a digital block array of the processing device. The processing device may include analog blocks that can be programmed and reprogrammed in some cases to implement various analog functions. The processing device may also include a digital block array. The digital block array may be configurable to implement a variety of digital logic circuits (e.g., DACs, digital filters, or digital control systems) using, in one embodiment, configurable user modules ("UMs"). The digital block array may be coupled to a system bus. Processing device may also include a memory device, such as random access memory ("RAM") and program flash. RAM may be static RAM ("SRAM"), and program flash may be a non-volatile storage, which may be used to store firmware (e.g., control algorithms executable by a processor to implement operations described herein). Processing device may also include a memory controller unit ("MCU") coupled to memory and the processor. The processor may be a processing element (e.g., processor core) configured to execute instructions or perform operations. The processor may include other processing elements as would be appreciated by one of ordinary skill in the art having the benefit of this disclosure. It should also be noted that the memory may be internal to the processing device or external to it. In the case of the memory being internal, the memory may be coupled to a processing element, such as the processing core. In the case of the memory being external to the processing device, the processing device is coupled to the other device in which the memory resides as would be appreciated by one of ordinary skill in the art having the benefit of this disclosure.

In one embodiment, the processing device further includes processing logic. Some or all of the operations of the processing logic may be implemented in firmware, hardware, or software or some combination thereof. The processing logic may receive signals from the phased array antenna or the single antenna, as described herein. The processing device may also include an analog block array (e.g., field-programmable analog array). The analog block array may also be coupled to the system bus. Analog block array may also be configurable to implement a variety of analog circuits (e.g., ADCs or analog filters) using, in one embodiment, configurable UMs. The analog block array may also be coupled to the GPIO ports. The processing device may include internal oscillator/clocks and communication block ("COM"). In another embodiment, the processing device includes a spread-spectrum clock. The oscillator/clocks block provides clock signals to one or more of the components of processing device. Communication block may be used to communicate with an external component, such as a host processor (also referred to as an application processor), via application interface ("I/F") line.

The processing device may reside on a common carrier substrate such as, for example, an integrated circuit ("IC") die substrate, a multi-chip module substrate, or the like. Alternatively, the components of processing device may be one or more separate integrated circuits and or discrete components. In one exemplary embodiment, processing device is the Programmable System on a Chip (PSoC®) processing device, developed by Cypress Semiconductor Corporation, San Jose, Calif. Alternatively, processing device may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to an application processor, but may include a system that measures the RF signals and sends the raw data to a host computer where it is analyzed by an application. In effect, the processing that is done by processing device may also be done in the application processor.

The multi-angle source-tracking tool 120 may be integrated into the IC of the processing device, or alternatively, in a separate IC. Alternatively, descriptions of multi-angle source-tracking tool 120 may be generated and compiled for incorporation into other integrated circuits. For example, behavioral level code describing parameters for multi-angle source-tracking tool 120, or portions thereof, may be generated using a hardware descriptive language, such as VHDL or Verilog, and stored to a machine-accessible medium (e.g., CD-ROM, hard disk, floppy disk, etc.). Furthermore, the behavioral level code may be compiled into register transfer level ("RTL") code, a netlist, or even a circuit layout and stored to a machine-accessible medium. The behavioral level code, the RTL code, the netlist, and the circuit layout may represent various levels of abstraction to describe the multi-angle source-tracking tool 120. It should be noted that the components of electronic system may include all, some, or none of the components described above.

In one embodiment, the electronic system may be used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and or video) player, a handheld gaming device, a signature input device for point of sale transactions, an eBook reader, medical instruments, warehouse tracking devices, such as scanners used by shipping companies, automotive devices, such as car keys and electronic devices within a vehicle, global position system ("GPS") or a control panel. Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and or alternating manner. The terms "first," "second," "third," "fourth," etc. as used herein are meant as labels to distinguish among different elements and may not necessarily have an ordinal meaning according to their numerical designation. As used herein, the term "coupled" may mean connected directly or indirectly through one or more intervening components. Any of the signals provided over various buses described herein may be time multiplexed with other signals and provided over one or more common on-die buses. Additionally, the interconnection and interfaces between circuit components or blocks may be shown as buses or as single signal lines. Each of the buses may alternatively be one or more single signal lines and each of the single signal lines may alternatively be buses.

The above description sets forth numerous specific details such as examples of specific systems, components, methods, and so forth, in order to provide an understanding of several embodiments of the present invention. It may be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth are merely exemplary. Particular implementations may vary from these exemplary details and still be contemplated to be within the scope of the present embodiments.

Embodiments of the claimed subject matter include, but are not limited to, various operations described herein. These operations may be performed by hardware components, software, firmware, or a combination thereof.

The above description sets forth numerous specific details such as examples of specific systems, components, methods, and so forth, in order to provide an understanding of several embodiments of the claimed subject matter. It may be apparent to one skilled in the art, however, that at least some embodiments of the may be practiced without these specific details. In other instances, well-known components or methods are not described in detail or are presented in simple block diagram format. Thus, the specific details set forth are merely exemplary. Particular implementations may vary from these exemplary details and still be contemplated to be within the scope of the claimed subject matter.

What is claimed is:

1. A method comprising:
   using a receiver of a first device, receiving from a second device, radio frequency (RF) signals; and
   using a processor of the first device, determining, based on the RF signals, a set of angle-estimation values of an angle between a plurality of antenna elements of one of the first device and the second device and an antenna element of the other of the first device and the second device, and a set of confidence measurements corresponding to the set of angle-estimation values, wherein each of the set of confidence measurements indicates a confidence of an angle-estimation value of the set of angle-estimation values.

2. The method of claim 1, wherein the determining the set of angle-estimation values includes determining the set of angle-estimation values of the angle between the plurality of antenna elements of the first device and the antenna element of the second device.

3. The method of claim 1, wherein the determining the set of angle-estimation values includes determining the set of angle-estimation values of the angle between the plurality of antenna elements of the second device and the antenna element of the first device.

4. The method of claim 1, wherein the using of the receiver of the first device includes using a first integrated circuit chip to implement the receiver, wherein the receiver is disposed on the first integrated circuit chip and the using of the processor of the first device includes using a second integrated circuit chip to implement the processor, wherein the processor is disposed on the second integrated circuit chip.

5. The method of claim 1, further comprising determining at least one of an Area-of Arrival (ARoA) value and an Area-of Departure (ARoD) value based on the set of angle estimation values and the set of confidence measurements, wherein the at least one of the ARoA value and the ARoD value represents an angled area between the plurality of antenna elements and the antenna element.

6. The method of claim 1 further comprising using the processor, determining an overall confidence measurement from the set of confidence measurements.

7. The method of claim 1, wherein the using of the processor comprises executing a multi-angle source-tracking tool to determine the set of angle-estimation values of the angle between the plurality of antenna elements and the antenna element and the set of confidence measurements.

8. The method of claim 1, wherein the determining the set of angle-estimation values and the set of confidence measurements comprises performing a source-tracking algorithm to obtain raw angle values based on digital samples of the RF signals, wherein the source-tracking algorithm comprises a cost function to weight the raw angle values to improve an accuracy of the source-tracking algorithm.

9. The method of claim 8, wherein the determining the set of angle-estimation values and the set of confidence measurements further comprises statistically modelling the raw angle values with a Gaussian Mixture Model (GMM) to obtain a plurality of mixtures, each mixture of the plurality of mixtures comprising GMM parameters including a weight, a mean, and a variance.

10. The method of claim 9, wherein the determining the set of angle-estimation values and the set of confidence measurements further comprises estimating an expected angle value for each of the plurality of mixtures from the GMM parameters to obtain the set of angle-estimation values of the angle between the plurality of antenna elements and the antenna element.

11. The method of claim 10, wherein the determining the set of angle-estimation values and the set of confidence measurements further comprises calculating a confidence measurement for each of the set of angle estimation values of the plurality of mixtures from the GMM parameters to obtain the set of confidence measurements.

12. The method of claim 1, wherein the determining the set of angle-estimation values and the set of confidence measurements comprises performing a source-tracking algorithm comprising at least one of a Generalized Cross Correlation (GCC) based algorithm, a Generalized Cross Correlation with Phase Transform (GCCPHAT) algorithm, and a MUltiple Signal Classification (MUSIC) algorithm.

13. A system comprising:
one or more antenna elements; and
a first wireless device coupled with the one or more antennas, wherein the first wireless device is configured to communicate radio frequency (RF) signals with a second wireless device, wherein the first wireless device comprises a processor to execute a multi-angle source-tracking tool configured to determine, based on the RF signals, a set of angle-estimation values of an angle between a plurality of antenna elements of one of the first device and the second device and an antenna element of the other of the first device and the second device and a set of confidence measurements corresponding to the set of angle-estimation values, wherein each of the set of confidence measurements indicates a confidence of an angle-estimation value of the set of angle-estimation values.

14. The system of claim 13, wherein the first wireless device comprises the processor and the plurality of antenna elements.

15. The system of claim 14, wherein the first wireless device comprises the processor and a receiver, wherein the processor is disposed on a first integrated circuit chip and the receiver is disposed on a second integrated circuit chip.

16. The system of claim 13, wherein to determine the set of angle-estimation values and the set of confidence measurements, the processor is configured to perform a source-tracking algorithm to obtain raw angle values, wherein the source tracking algorithm comprises a cost function to weight the raw angle values to improve an accuracy of the source-tracking algorithm.

17. The system of claim 13, wherein the processor is configured to perform at least one of a Generalized Cross Correlation (GCC) based algorithm, a Generalized Cross Correlation with Phase Transform (GCC-PHAT) algorithm, and a MUltiple Signal Classification (MUSIC) algorithm.

18. The system of claim 13, wherein the processor is configured to determine at least one of an Area of Arrival (ARoA) value or an Area of Departure (ARoD) value from the set of angle estimation values and the set of confidence measurements, wherein the at least one of the ARoA value or the ARoD value represents an angled area between the plurality of antenna elements and the antenna element.

19. A wireless device, comprising:
a receiver configured to receive from another wireless device, radio frequency (RF) signals; and
a processor configured to determine, based on the RF signals, a set of angle-estimation values of an angle between a plurality of antenna elements of one of the wireless devices and an antenna element of the other of the wireless devices, and a set of confidence measurements corresponding to the set of angle-estimation values, wherein each of the set of confidence measurements indicates a confidence of an angle-estimation value of the set of angle-estimation values.

20. The wireless device of claim 19, wherein the processor is configured to determine one of an Area of Arrival (ARoA) value and an Area of Departure (ARoD) value from the set of angle estimation values and the set of confidence measurements, wherein the one of the ARoA value and the ARoD value represents an angled area between the plurality of antenna elements and the antenna element.

* * * * *